United States Patent
White et al.

(10) Patent No.: US 10,055,750 B2
(45) Date of Patent: *Aug. 21, 2018

(54) DISTRIBUTING VIRTUAL ITEMS FOR COLLECTION IN THE REAL WORLD

(71) Applicant: Sony Interactive Entertainment Inc., Tokyo (JP)

(72) Inventors: Payton R. White, Foster City, CA (US); Stephen C. Detwiler, Oakland, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,440

(22) Filed: Apr. 21, 2017

(65) Prior Publication Data

US 2017/0228754 A1 Aug. 10, 2017

Related U.S. Application Data

(63) Continuation of application No. 12/275,127, filed on Nov. 20, 2008, now Pat. No. 9,646,008.

(51) Int. Cl.
*G06Q 30/02* (2012.01)
*G06F 17/30* (2006.01)

(52) U.S. Cl.
CPC ... *G06Q 30/0222* (2013.01); *G06F 17/30035* (2013.01); *G06F 17/30041* (2013.01)

(58) Field of Classification Search
CPC ........ G06F 17/30035; G06F 17/30041; G06Q 30/0222
See application file for complete search history.

(56) References Cited

U.S. PATENT DOCUMENTS

| | | | |
|---|---|---|---|
| 8,257,177 B1* | 9/2012 | Saund | A63F 13/327 463/39 |
| 2002/0128903 A1* | 9/2002 | Kernahan | G06Q 30/02 705/14.22 |
| 2008/0009349 A1* | 1/2008 | Wolfe | H04W 4/02 463/42 |
| 2008/0065488 A1* | 3/2008 | Schwagmann | G06Q 30/02 705/14.36 |

(Continued)

FOREIGN PATENT DOCUMENTS

EP 1077437 A2 * 2/2001 ........... G06Q 20/387

*Primary Examiner* — Alexander Q Huerta
(74) *Attorney, Agent, or Firm* — Martine Penilla Group, LLP

(57) ABSTRACT

A system and method for distributing virtual items for collection by a user device in the real world are provided. One embodiment of a method includes sending a notification to a user device indicating availability of a virtual item, the virtual item configured to be available to the user device when the user device is determined to be proximate to one or more real world geolocations associated with the virtual item. The method provides for determining that the user device is proximate to the one or more geolocations and for providing information related to the virtual item so as to enable viewing of at least a portion of the virtual item. The method also provides sending an activated version of the virtual item to the user device when predetermined conditions associated with viewing the virtual item have been met.

21 Claims, 5 Drawing Sheets

(56) References Cited

U.S. PATENT DOCUMENTS

| | | | |
|---|---|---|---|
| 2008/0167129 A1* | 7/2008 | Aaron | A63F 13/10 463/42 |
| 2009/0076912 A1* | 3/2009 | Rajan | G06Q 30/02 705/14.64 |
| 2010/0002122 A1* | 1/2010 | Larson | H04N 5/23293 348/333.01 |
| 2011/0106613 A1* | 5/2011 | Felt | G01C 21/00 705/14.46 |
| 2012/0054786 A1* | 3/2012 | Kinder | H04N 7/088 725/23 |
| 2013/0288798 A1* | 10/2013 | Ruckart | A63F 13/10 463/40 |
| 2014/0031131 A1* | 1/2014 | Ackley | A63F 13/216 463/42 |

* cited by examiner

DISTRIBUTING VIRTUAL ITEMS FOR COLLECTION IN THE REAL WORLD

CLAIM OF PRIORITY

This application is a Continuation Application under 35 U.S.C. § 120 of U.S. application Ser. No. 12/275,127, entitled "MODIFYING VIRTUAL ITEM STATES IN CONJUNCTION WITH DIGITAL BROADCAST," and filed on Nov. 20, 2008, which is herein incorporated by reference.

FIELD OF THE DISCLOSURE

This invention relates to broadcasting virtual items, and specifically to broadcasting virtual items based on a virtual items association with a physical world location.

BACKGROUND

As digital multimedia accelerates into the mainstream, more and more people rely on this multimedia as a daily form of entertainment. From video clips to music videos to TV shows and movies, a wide range of multimedia can be found being accessed all around the world through the Internet, television, radio, etc.

Digital multimedia is often combined with interactive forms of entertaining involving virtual worlds. A virtual world is a simulated environment in which users may interact with each other via one or more computer processors. Users may appear on a video screen in the form of representations referred to as avatars. The degree of interaction between the avatars and the simulated environment is implemented by one or more computer applications that govern such interactions as simulated physics, exchange of information between users, and the like. The nature of interactions among users of the virtual world is often limited by the constraints of the system implementing the virtual world.

With many countries mandating a change from the presentation of multimedia with an analog signal format to a new digital format, more broadcaster-user systems have become available for users to obtain different forms of multimedia. It is within this context that embodiments of the current invention arise.

SUMMARY

Embodiments of the present disclosure provide methods and systems for distributing virtual items for collection in the real world. It should be appreciated that the present disclosure can be implemented in numerous ways, such as a process, an apparatus, a system, a device or a method on a computer readable medium. Several inventive embodiments of the present disclosure are described below.

In certain embodiments, a method may include operations for sending a notification to a user device indicating that availability of a virtual item, the virtual item configured to be available to the user device when the user device is determined to be proximate to one or more real world geolocations associated with the virtual item. In these and other embodiments, the method may also include operations for determining, by the one or more servers, that the user device is proximate to the one or more geolocations associated with the virtual item for providing, by the one or more servers to the user device, information related to the virtual item when the user device is determined to be proximate to the one or more geolocations associated with the virtual item so as to enable viewing of at least a portion of the virtual item. The method may further include operations for receiving, at the one or more servers from the user device, an indication that a predetermined condition has been met associated with the viewing of the one or more the portions of the virtual item in order to cause activation of the virtual item. Moreover, according to some embodiments, the method may include operations for sending, by the one or more servers to the user device, an activated version of the virtual item for access by the user device.

Other aspects of the disclosure will become apparent from the following detailed description, taken in conjunction with the accompanying drawings, illustrating by way of example the principles of the invention.

DETAILED DESCRIPTION

Figure 1A:
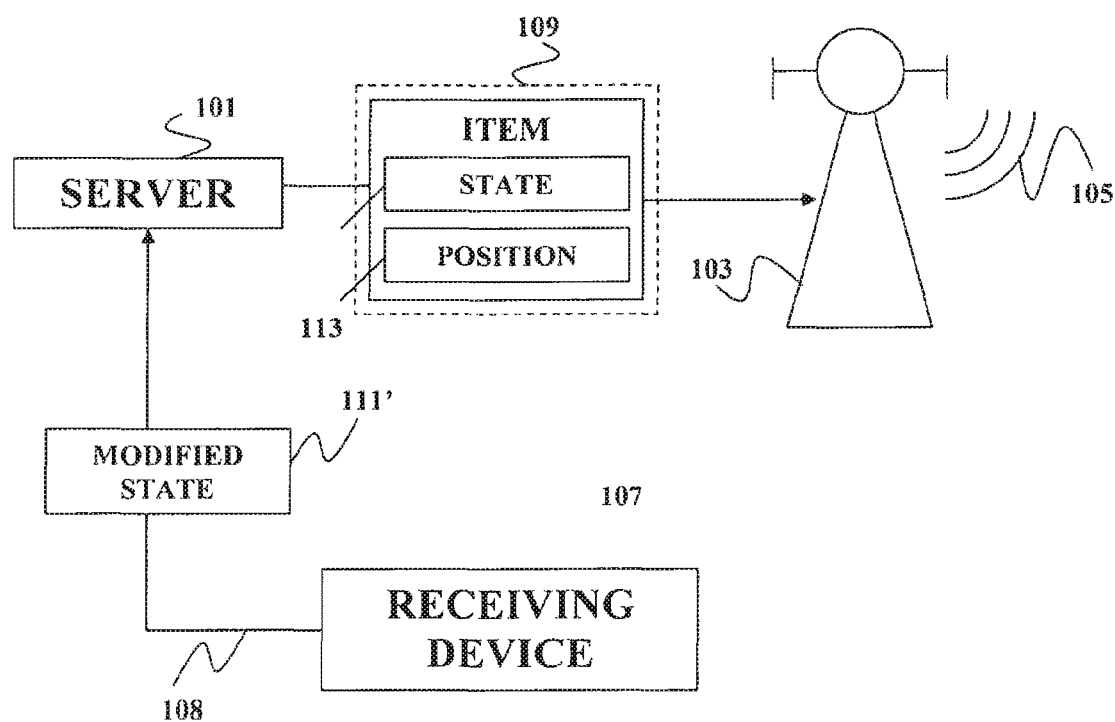
FIG. 1A schematically illustrates an example of modifying a virtual item state in accordance with an embodiment of the present invention.
Figure 1B:
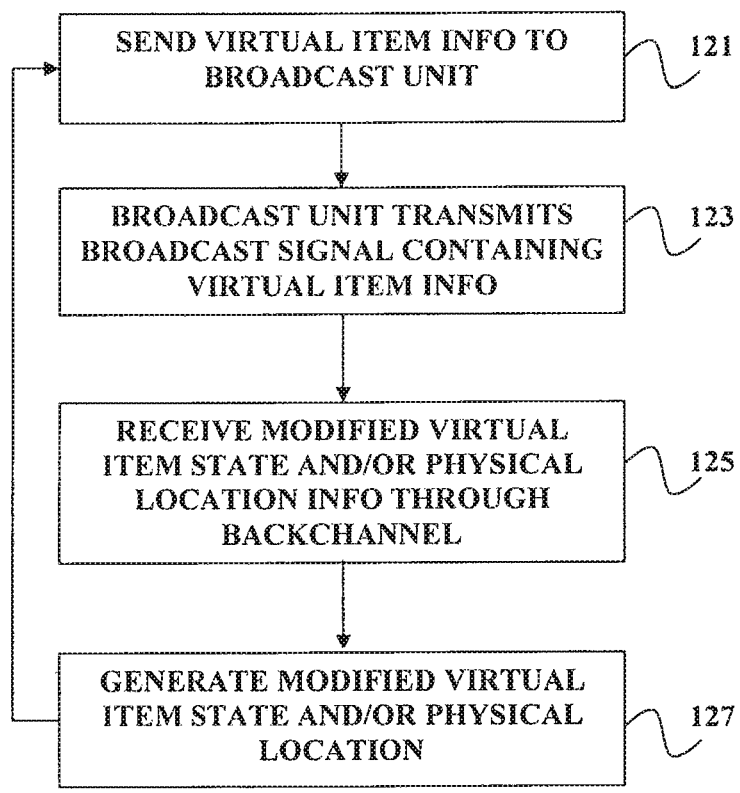
FIG. 1B is a flow diagram depicting an example of broadcasting virtual item state information in accordance with an embodiment of the present invention.

FIG. 1A schematically illustrates an example of modifying a virtual item state in conjunction with a digital broadcast signal in accordance with an embodiment of the invention. Preferably the digital broadcast signal is of a type that can be received by a mobile or handheld (M/H) digital broadcast receiving devices. Operation of a method for broadcasting virtual item information may be implemented by the server 101 as depicted in FIG. 1B. The server 101 may send information relating to one or more virtual items 109 to the broadcast unit 103 as indicated at 121. The broadcast unit may then broadcast the virtual item information as a broadcast signal 105 as indicated at 123. Receivers 107 may receive the information and modify portions of the information. Modifications to selected portions the virtual item information may then be sent back to the server 101 via a backchannel 108. The server 101 may receive the modifications as indicated at 125 and generate modified virtual item information as indicated at 127. The modified virtual item information may then be sent to the broadcast unit 103 for transmission.

As used herein, a virtual item refers to an item that is defined in terms of computer-readable data embodied in some computer readable medium such as a computer memory or digital data storage device. A virtual item may distinguished from a real or physical item in that a virtual item may be transmitted electronically and normally requires the assistance of some electronic device capable of interpreting computer-readable information and converting the information to some form that is perceivable by a living percipient. A real or physical item, by contrast requires no such interpretation of computer-readable information in order to be similarly perceived. It is noted that the sole act of illuminating an object so that it can be seen, without more, does not constitute "assistance of some electronic device" for the purposes of this application.

Each virtual item 109 have an associated state 111 defined by one or more criteria that including position information 113 which is related to both the virtual item and a particular location in the physical world. By way of example, and not by way of limitation, information related to a virtual item 109 associated with a certain region of the physical world, may only be transmitted to or received by those receiving devices that are presently within a region of the physical world that is within sufficient proximity to the particular location, and not to receiving devices that are outside of that region of the physical world. By way of example, and not by way of limitation, the receiving device may be configured, e.g., by suitable computer programming or hardware configuration to refrain from providing certain information relating to a virtual item 109 until the receiving device 107 determines that it is within sufficient proximity to the particular location associated with the virtual item 109. The receiving device 107 may be equipped with a suitable position locating device, such as a GPS receiver, to facilitate determination of the location of the receiving device. The receiving device 107 may compare its location, as determined from the position locating device, against the positional information 113 associated with the virtual item.

Once the receiving device 107 extracts information relating to a virtual item from the broadcast signal 105 leaving the broadcast tower 103, a user of the receiving device 107 may then selectively perceive and manipulate that information using the receiving device 107.

By way of example, the digital broadcast signal 105 may be a modulated radiation signal transmitted from a broadcast transmitter 105, e.g., in the form of an over-the-air broadcast, such as by a radio-frequency electromagnetic wave signal. Alternatively, embodiments of the invention may be used in conjunction with digital broadcasts transmitted over media such as cable (e.g., coaxial cable), optical fiber, or satellite transmission.

By way of example, the digital broadcast signal may be configured in accordance with a digital broadcast standard. Examples of digital broadcast standards include, but are not limited to, the Digital Video Broadcasting (DVB) family of standards maintained in Europe and Australia, the Advanced Television Standards Committee (ATSC) family of standards developed for use in the United States and Canada, the Integrated Services Digital Broadcasting (ISDB) family of standards developed for use in Japan, and the Digital Multimedia Broadcasting (DMB) standard used in South Korea.

The DVB family of standards includes the DVB-S and DVB-S2 standards for satellite television, the DVB-T and DVB-T2 standards for terrestrial television, the DVB-C standard for cable televisions, the DVB-H standard for mobile television, and other DVB standards, which have been or may be developed. The ATSC family of standards includes the ATSC standard for terrestrial television broadcasts and the ATSC M/H standard for broadcasts to mobile and handheld devices. The IDSB family of standards includes the ISDB-S, ISDB-T, and ISDB-C standards, which were developed for satellite, terrestrial, and cable television respectively.

By way of example, and not by way of limitation, the digital broadcast signal may be configured according to the ATSC or ATSC-M/H standards. The ATSC standard is described in detail, e.g., in "ATSC Digital Television Standard Part 1—Digital Television System" (A/53, Part 1:2007), "ATSC Digital Television Standard Part 2—RF/Transmission System Characteristics" (A/53, Part 2:2007), and "ATSC Digital Television Standard Part 3—Service Multiplex and Transport Subsystem Characteristics" (A/53, Part 3, 2007), the disclosures of all three of which are incorporated herein by reference. The ATSC Data Broadcast Standard is described, e.g., in (ATSC Recommended Practice: Implementation Guidelines for the ATSC Data Broadcast Standard (Doc. A/90)", which is incorporated herein by reference.

The receiving device 107 may select information relating to one or more virtual items 109 from the broadcast signals 105 for the receiving device 107 to process. In some embodiments, the receiving device 107 may be configured to present information relating to one or more virtual items 109 based on one or more pre-determined conditions in addition to proximity to the particular location in the physical world. Such pre-determined conditions may include, but are not limited to a particular time of day, a particular user profile, a particular predetermined state of the virtual item, storage of certain predetermined information in the receiving device, or the performance of one or more predetermined actions by the user with the receiving device.

Once a virtual item 109 has been selected, the user may interact with the virtual item 109 and modify its state using the receiving device 107. By way of example, and not by way of limitation, the receiving device 107 may generate or modify information relating to the virtual item 109 in a way that results in a modified state 111' of the virtual item 109. Information relating to the modified state 111' may be transmitted back to the server 101 via the receiving device 107. The server 101 may then save the modified state 111' of the virtual item and include information relating to the modified state in subsequent broadcast signals 105. By way of example and not by way of limitation, the new state 111' may be saved to the server 101 when the percipient user of the receiving device 107 leaves the physical location associated with the virtual item 109. Alternatively, the new state may be saved when the user gains access to a network through the receiving device 107.

Figure 2:
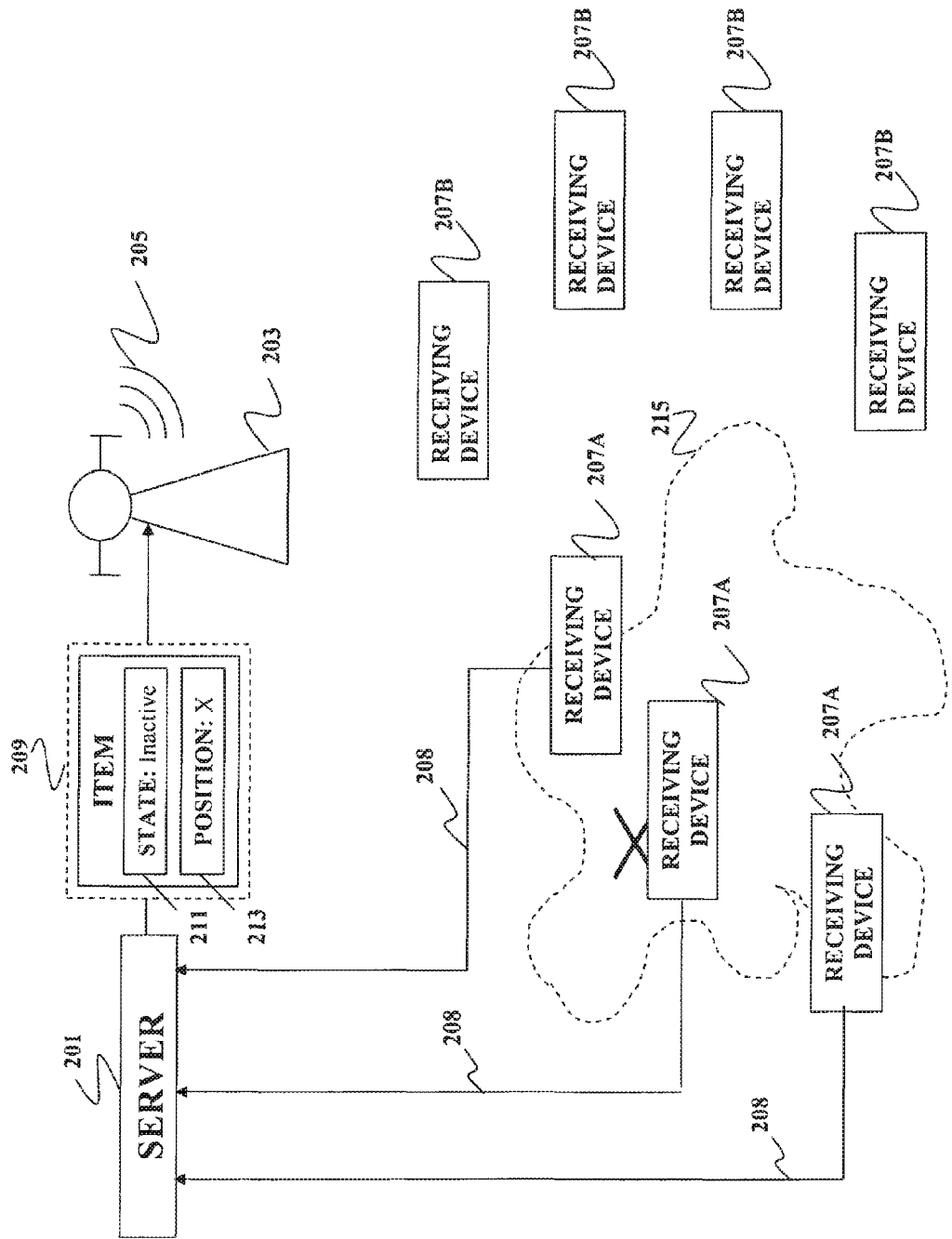
FIG. 2 illustrates a more specific example illustrating broadcasting information related to virtual item states that may be facilitated by embodiments of the present invention FIG. 3 schematically illustrates a broadcast environment in which embodiments of the present invention may be employed.

FIG. 2 illustrates a more specific example of modifying virtual item states that may be facilitated by embodiments of the present invention. By way of example, and not by way of limitation, a multi-user game similar to a game of "capture the flag" may be implemented using embodiments of the present invention. In this example, a server 201 stores information regarding a virtual "flag" 209. The virtual "flag" 209 has a virtual state 211 that includes information relating to a physical world location 213 associated with it. Initially, the state 211 of the virtual "flag" 209 may be inactive if users of the game have yet to initiate game play. The "flag" 209 may have a starting physical location tag 213, which is marked X in FIG. 2.

The server 201 sends information relating to this virtual "flag" 209 to the broadcast tower 203, which broadcasts this information via a broadcast signal 205. Because the virtual "flag" 209 is tagged with a physical world location X, the virtual "flag" 209 need not be broadcast to every physical location, but instead may be broadcast to a localized area 215 proximate the physical location X associated with the "flag" 209. Once the percipient users of the receiving devices 207A come within this localized area 215, they become capable of receiving information regarding this virtual "flag" 209. However, if the percipient user of the receiving device 207B lies outside the localized area 215 associated with the virtual "flag" 209, the virtual "flag" 209 along with its state 211 and physical world location 213 is not presented to that user. It is then up to the percipient user of the receiving device 207B to become physically present within the localized area 215 of the virtual "flag" 209 before he can receive information regarding this virtual "flag" 209.

The receiving device 207B may not present the information for any number of reasons. For example, the broadcasting tower 203 may be one of a plurality of towers in different locations that broadcast over limited regions. The information relating to the virtual flag may only be broadcast to a tower or towers whose broadcast regions include the location of the virtual flag 209. If device 207B is located outside of these broadcast regions it simply doesn't receive information relating to the virtual flag 209. Alternatively, the receiving device 207B may be configured to present the information relating to the virtual flag only when the receiving device is within the localized area 215 associated with the virtual flag. The receiving devices may each be configured with suitable position locating means and computational capabilities in order to determine whether or not a receiving device is within the localized area.

As soon as the first receiving device 207A becomes physically present at the physical world location X of the virtual "flag" 209, he is allowed to pick up this virtual "flag" 209 and modify it accordingly. First the state 211 of the virtual "flag" 209 may automatically change from inactive to active, allowing users within the localized area 209 to become aware of the new state 209 of the virtual "flag" 209 via updates sent by the server 201 through the broadcast tower 203 via broadcast signal 205. The user who picked up the virtual "flag" 209 may have an opportunity to move this virtual "flag" 209 to a different physical location by physically moving his receiving device 207A with information relating to the virtual "flag" 209 stored in it to another physical location. This information may be transmitted back to the server 201 via a backchannel 208.

At this point, the user's receiving device 209 may make note of the new physical location of the virtual "flag" and will relay this information to the server 201. The server 201 may store this information, update the state 211 and physical world location 213 of the virtual "flag" 209, and broadcast this updated information to another localized area proximate the new physical world location of the virtual "flag" 209. This process may repeat itself until the game has been completed.

By way of example, and not by way of limitation, other applications that may make use of embodiments of the present invention include photo sharing, virtual "graffiti", virtual geo-caching, and virtual scavenger hunts that are tied to advertising. Photo sharing may involve storing a user's photos from a particular physical location (e.g., The Golden Gate Bridge) in the form of a virtual item. For example, each percipient user of a receiving device who is present at the Golden Gate Bridge may be sent a virtual item via a broadcast signal from a broadcast tower containing previous photos from other percipient users of receiving devices that were present and took photos at the Golden Gate Bridge. The user of a receiving device that is currently located at the Golden Gate Bridge may then have the opportunity to update the state of the virtual item by linking his own pictures taken at the Golden Gate Bridge to this virtual item. Thus, future users of receiving devices who become present at the Golden Gate Bridge are able to view these photos as part of the virtual item being sent by broadcast towers in that area.

Virtual "graffiti" may involve the ability to create personal imprints at a physical location via a virtual item. For example, a user of a receiving device may come into proximity to a particular location, such as a famous building or landmark. A virtual item may be associated with that particular location and information relating to that virtual item may be broadcast to the vicinity of the location. The user of a receiving device that receives the information may then select the virtual item and change the virtual item's state. This state change may involve virtually writing something on this location (e.g. Person A was here) such that future users of receiving devices who come across this particular location may receive a virtual item with Person A's virtual "graffiti".

Virtual geo-caching may utilize a virtual item instead of a physical cache containing real items. Conventional geo-caching is an outdoor treasure-hunting game in which participants typically use a Global Positioning System (GPS) receiver or other navigational techniques to hide and seek containers (called "geocaches" or "caches") anywhere in the world. A typical cache is often a small waterproof container containing a logbook and "treasure," usually toys or trinkets of little value. A person finding the cache typically signs his name or otherwise notes his finding of the cache in the logbook. A pencil is often included in the cache for this purpose. In virtual geo-caching, by contrast, information relating to the virtual item may be broadcast to the vicinity of a physical world location and presented by a receiving device when the receiving device is in sufficient proximity to that location. The user may then modify the information using the receiving device. The virtual cache information may include a logbook. A user finding the cache may enter information regarding his finding of the cache into the logbook via the receiving device.

In some embodiments, virtual scavenger hunts may be tied to advertising coupons. For example, several virtual items, each representing a portion of an advertising coupon (e.g., a coupon for free soda from a store or restaurant) may be distributed to users of receiving devices from a server via broadcast signals. In addition to being a portion of the full advertising coupon, these virtual items may also contain additional clues as to the remaining virtual items needed to complete the full advertising coupon. Users of receiving devices present in a localized area proximate the virtual item (e.g., the localized area where the virtual item is being broadcast) may select the virtual item and store it in their receiving device. Once the user of the receiving device has collected all virtual items associated with portions of the full advertising coupon, the receiving device may present the user of the receiving device with the full advertising coupon that may be then be redeemed. By way of example, and not by way of limitation, the coupon may include a bar code that is presented on a visible display screen affiliated with the receiving device. A merchant may scan the bar code with a bar code reader to redeem the coupon. Alternatively, the coupon may be redeemed through a wireless personal area network transceiver affiliated with the receiving device and a corresponding device operated by the merchant.

Figure 3:
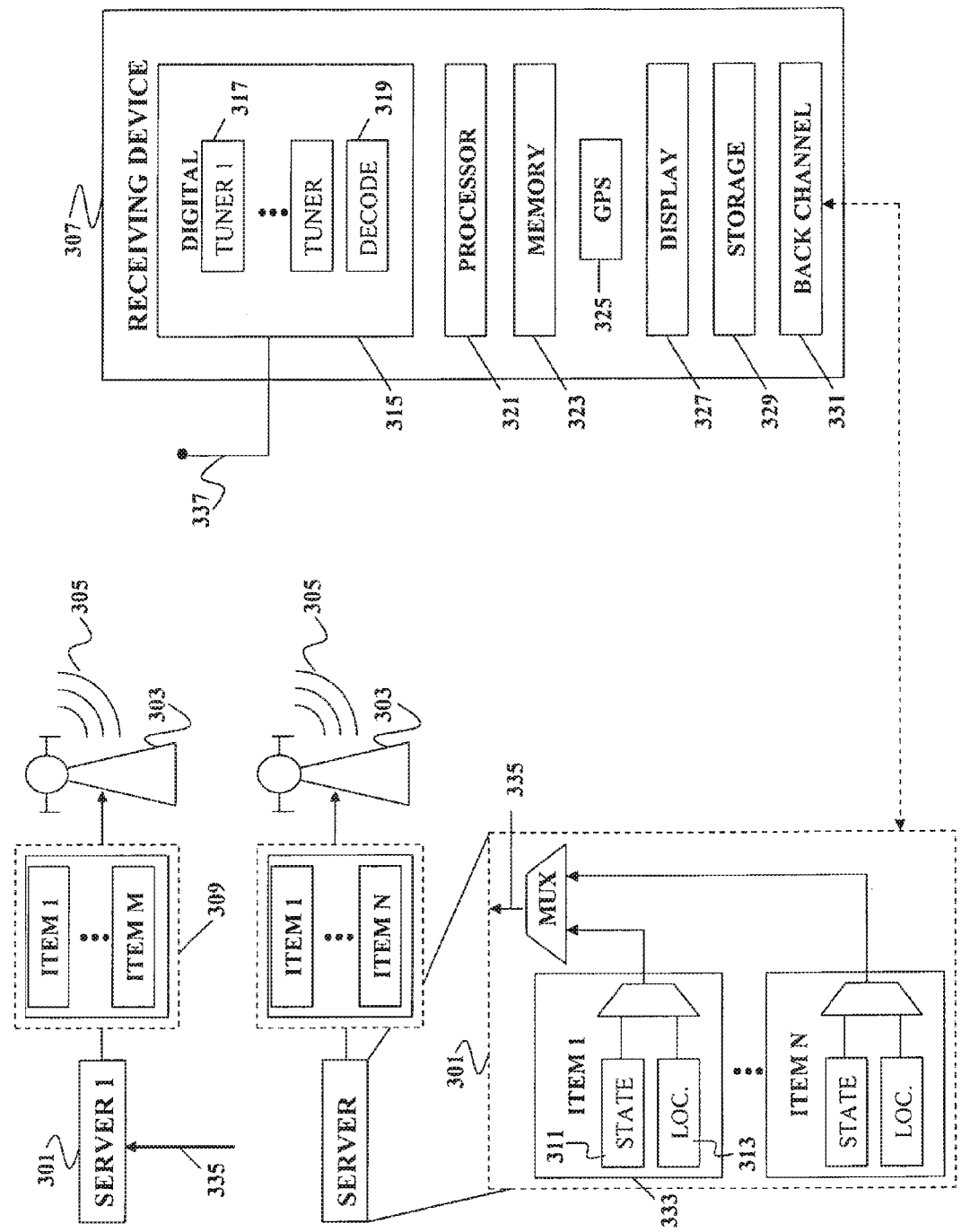

FIG. 3 schematically illustrates an example of a broadcast environment in which embodiments of the present invention may be implemented. Servers 301 may receive or generate input data 335 associated with virtual items. This input data 335 may be associated with a virtual item 309. Each virtual item contains a state 311 and a physical location tag 313. The server 301 may collect certain information relating to the virtual item 309, its state 311 and associated physical location tag 313 into a digital broadcast data stream, which may be converted to a digital broadcast signals 305 for reception by digital broadcast receivers 307. The digital broadcast signals 305 are transmitted to the receiving devices 307 via broadcast towers 303. It is noted that for the sake of example, two digital broadcast signals are shown as being transmitted from different towers. This is not to be construed as a limitation upon any embodiment of the invention. Alternatively, any number of different digital broadcast signals may be transmitted from any number of towers. Furthermore two or more different broadcast signals may be broadcast simultaneously by the same broadcast tower, e.g., using some multiplexing scheme, such as frequency division multiplexing or time division multiplexing.

By way of example, and not by way of limitation, the digital broadcast signal 305 may be a modulated radiation signal transmitted from a broadcast tower 303, e.g., in the form of an over-the-air broadcast, such as by a radio frequency electromagnetic wave signal. It is noted that the digital broadcast signal 305 transmitted by a given broadcast tower 303 may include multiple digital broadcast channels modulated at different carrier signal frequencies. Broadcast towers 303 associated with different servers 301 may broadcast over different sets of frequencies. Furthermore, the digital broadcast signal 305 may be transmitted in a form other than an over-the-air broadcast. Alternatively, embodiments of the invention may be used in conjunction with digital broadcasts transmitted over media such as cable (e.g., coaxial cable), optical fiber, or satellite transmission.

The input data 335 may include data from multiple sources. For example, within the server 301 data for different virtual items 333 may be made up of state and location data. Multiple virtual items 333 may be multiplexed with each other into the digital broadcast data stream 309. The digital broadcast data stream 309 may include multiple virtual items 333 with data representing the virtual item's state and physical location. The virtual items 333 that make up the digital broadcast data stream 309 may be subject to data transforms, such as source coding and compression. As used herein, "source coding and compression" refers to bit rate reduction methods, also known as data compression. The server 301 may also include a coder configured to minimize the number of bits needed to represent the virtual items.

The server 301 may also subject the digital broadcast data stream 309 to service and multiplex transport operations. As used herein, "service multiplex and transport" includes, but is not limited to, the operation of dividing the digital data stream into "packets" of information, the operation of uniquely identifying each packet or packet type, and the appropriate methods of multiplexing data stream packets into a single data stream.

The digital broadcast stream 309 may be converted to a digital broadcast signal 305 through processes referred to as channel coding and modulation. The channel coder takes the data bit stream encoded in the digital broadcast data stream 309 and adds additional information that can be used by a receiving device 307 to reconstruct data from the received signal, which, due to transmission impairments, may not accurately represent the transmitted signal. A modulation subsystem (or physical layer) uses the digital data stream information to modulate the transmitted signal. By way of example, and not by way of limitation, under the ATSC standard, the modulation subsystem offers two modes. Both modes are based on vestigial sideband modulation. One mode is a terrestrial broadcast mode known as 8-VSB. The other is a high data rate mode known as 16-VSB.

A digital broadcast receiving device 307 receives the digital broadcast signal 305 and extracts the digital broadcast stream 309 including virtual items, their state, and information associated with their physical location. By way of example, and not by way of limitation, the digital broadcast receiving device 307 may include a digital receiver 315, a processor 321, a memory 323, a display 327, and a data storage device 329. The digital broadcast receiving device 307 may be any type of device capable of receiving and utilizing the digital broadcast signal 305. By way of example, the digital broadcast receiving device 307 may be a digital television set, digital radio receiver, personal computer, laptop computer, a mobile or handheld device such as a cellular telephone, mobile internet device or mobile digital television receiver. Furthermore, the term digital broadcast receiving device encompasses, but is not limited to, "digital media receivers", GPS devices, game consoles, portable game devices, home, mobile, or device security systems, and any combination thereof and including other devices for which the broadcast receiving device 307 may be coupled to provide command and control.

The digital receiver 315 may include one or more tuners 317 and a decoder 319. The tuner(s) 317 may be coupled to an antenna 337 that receives the digital broadcast signal 305. The tuner 317 selects one or more particular frequencies from among the various signals that are picked up by the antenna 337. The tuner 317 and decoder 319 may extract data from the digital broadcast signal 305. By way of example the tuner 317 and decoder 319 may provide the following functions: demodulation, transport stream demultiplexing, decompression, error correction, analog-to-digital conversion, AV synchronization and media reformatting to fit the specific type of display 327 optimally. As used herein, demodulation refers to the process of transforming the received digital broadcast signal 305 into a useable signal from which data may be extracted and/or from which quality images and sound may be produced.

Transport stream demultiplexing may be implemented, e.g., where multiple digital signals are combined and then transmitted from one antenna source to create over the air broadcasts. In such a case, the decoder 319 may decode the digital broadcast data stream 309 and convert it to a suitable form for display of a particular virtual item with the display 327.

The decoder 319 may implement decompression if the digital broadcast data stream 309 contains data in compressed form. By way of example, and not by way of limitation, the tuner 317 may decompress such data, e.g., by unpacking compressed packets of digital data to their original size. The decoder 319 may also implement error correction to make sure that any data that is missing from the received digital broadcast signal 305 can be corrected. For instance, sometimes interference or a poor-quality signal will cause the loss of data information that the tuner 317 receives. In such cases, the decoder 319 may perform a number of checks and repair data so that information carried by the digital broadcast signal 305 may be viewed on the display 327 or data may be utilized by the processor 321.

The decoder 319 may implement AV synchronization to coordinate audio and video signals being displayed on the display 327 in proper time. AV synchronization ensures that the audio does not lag behind the video that is being displayed on the display 327 or vice versa, so that both audio and video are in sync. Media reformatting allows the display 327 to properly display images using the data extracted from the digital broadcast signal 305. Media reformatting is important since the formatting of images on different types of displays may differ significantly according to the technology employed. For example, some displays utilize interlaced picture, whereas others utilize a progressive-scan picture.

Virtual items 333 and any images associated with them may be displayed on the video display 327. By way of example, the display 327 may be any suitable video and/or audio-visual display compatible with the digital broadcast signal 305. By way of example, and not by way of limitation, the display 327 may include a video monitor, such as a cathode ray tube (CRT), plasma display, liquid crystal display (LCD) or organic light-emitting diode (OLED) display. In addition, the display 327 may include one or more devices for generating audio, e.g., one or more speakers. In addition, the display 327 may include one or more audio speakers that produce audible or otherwise detectable sounds.

The processor 321 may be configured to allow the percipient user of the receiving device 307 to interact with the receiving device 307. Furthermore, the processor may be configured to run software applications, and optimally, an operating system. Such software may include software configured (e.g., by suitable programming) to implement a method for modifying a state of a virtual item 333. An example of such a method is described below with respect to FIG. 4.

The memory 323 may be coupled to the processor 321 and store applications and data for use by the processor 321. The memory 323 may be in the form of an integrated circuit, e.g., RAM, DRAM, ROM, and the like.

The receiving device 307 may further include a data storage device 329 such as a hard disk drive that provides non-volatile storage for applications and data. The data storage device 329 may be used for temporary or long-term storage of files retrieved form a slower data storage device. By way of example, the data storage device 329 may be a fixed disk drive, removable disk drive, flash memory device, or tape drive. Alternatively, the data storage device 329 may be, e.g., a CD-ROM, DVD-ROM, Blu-Ray, HD-DVD, UMD, or other optical storage device.

A computer program for implementing a method for modifying a state of a virtual item may be stored in a computer readable medium, such as the memory 323 or data storage device 329 in the form of instructions that can be executed on the processor 321. An example of such a method is described below with respect to FIG. 4.

The receiving device 307 may also implement a back channel 331 that allows information to be sent from the device 307 to a server 301. The back channel 331 may be used to transmit information relating to a modified state of a virtual item back to the server 301. By way of example, and not by way of limitation, the back channel 331 may be implemented through a digital broadcast signal transmitted from the device 307, e.g., via the antenna 337. Alternatively, the back channel 331 may be implemented through some other mode of communication such as wireless telephony (e.g., cellular), wireless internet, cable, optical fiber, and the like.

The selection of digital broadcast data streams 309 may be filtered from a geographic perspective based on device position information. For example, in the case of a mobile or hand-held device, information relating to a physical world location of the receiver 315 may be used to filter which virtual items 333 are relevant depending on the location of the receiver. To facilitate such functionality, the receiving device 307 may include a position location system 325. In some embodiments, the function of the position location system 325 may be implemented by one of the tuners 317 in conjunction with software running on the processor 321. By way of example, and not by way of limitation, the position location system 325 may determine a position of the receiving device by comparing time of arrival of position locating signals originating from sources having known locations. The position locating signals may originate from any suitable broadcast source. By way of example, but not by way of limitation, such broadcast sources may be located on one or more satellites in geosynchronous orbit. Alternatively, such broadcast sources may include one or more of the broadcast towers 303.

In addition to the components of the receiving device 307 described, a receiving device 307 may include components not shown in FIG. 3. A receiving device 307 may include well-known support functions such as input/output (I/O) elements, power supplies (P/S), a clock (CLK), and a cache. The receiving device 307 may further comprise of a graphics subsystem, which may include a graphics processing unit (GPU) and graphics memory. The graphics memory may include a display memory (e.g., a frame buffer) used for storing pixel data for each pixel of an output image. The graphics memory may be integrated in the same device as the GPU, connected as a separate device with the GPU, and/or implemented within the memory. Pixel data may be provided to the graphics memory directly from the processor 321. Alternatively, the processor 321 may provide the GPU with data and/or instructions defining the desired output images, from which the GPU may generate the pixel data of one or more output images. The graphics subsystem may periodically output pixel data for an image from the graphics memory to be displayed on the display device 327.

The components of the receiving device 307 described above may be operably connected to each other via one or more data buses. In addition, the components described above may be implemented in hardware, software, or firmware or some combination of two of more of these.

Figure 4:
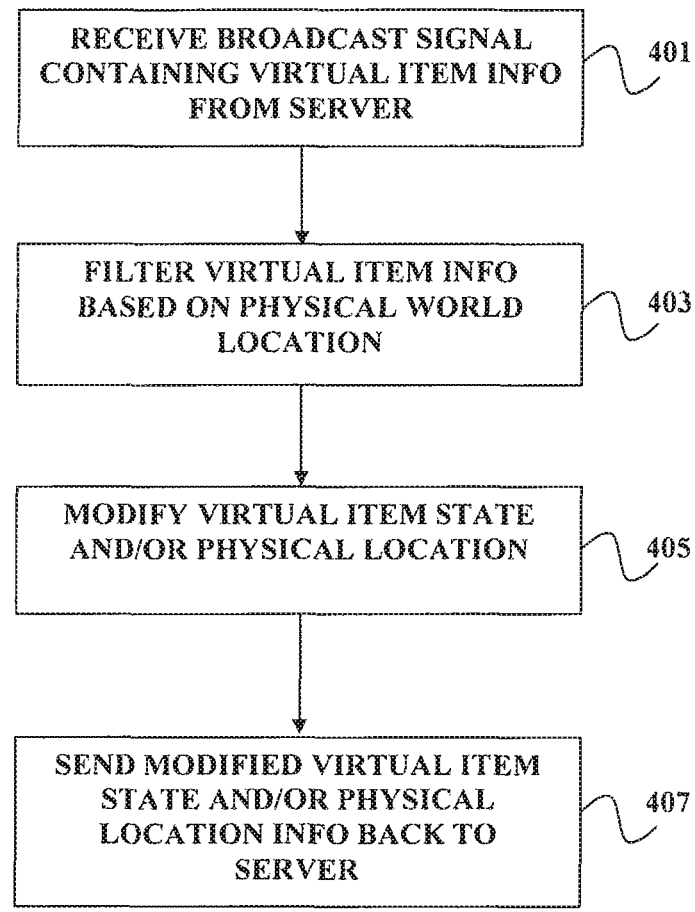
FIG. 4 is a flow diagram illustrating a method of modifying a virtual item state from the perspective of a percipient user of a receiving device.

FIG. 4 is a flow diagram illustrating a method of modifying a virtual item state from the perspective of a percipient user of a receiving device. A receiving device may receive information relating to one or more virtual items from a broadcast signal as indicated at 401. The information relating to each virtual item may includes state information and a location tag associated with the virtual item's physical world location. The receiving device may receive the broadcast signals containing the virtual item information when the receiving device comes within the range of the broadcast signal as described at 401. Alternatively, the broadcast signals containing the virtual item information may be broadcast over a much wider area and the receiving device may receive the information whenever it is in sufficient proximity to a broadcast source to detect and demodulate the signal. As noted above, a server may generate the virtual items and convert them into digital broadcast data streams, which are later converted into digital broadcast signals to be broadcast via a broadcast tower.

Upon receipt of these digital broadcast signals, a receiving device may filter out virtual item information based on physical world location as described at 403. If, for example, a particular virtual item has a physical world location that is in proximity to the receiving device, and is of particular interest to the percipient user of the receiving device, then the receiving device may select the virtual item for modification. Information relating to virtual items may be filtered based on a physical world location of the receiving device and physical world locations associated with the virtual items.

Such filtering may compare the physical world locations associated with the virtual items against the physical world location of the receiving device. If information relating to a particular virtual item is received by a receiving device, and the physical world location tag is of a location not in proximity to the percipient user of the receiving device, the receiving device may ignore or otherwise filter out this information from the information received from the digital broadcast. If the receiving device is in sufficient proximity to the physical world location associated with the virtual item, the receiving device may present this information on a display device associated with the receiving device.

Once the receiving device has received a particular virtual item, the user of the device may modify the virtual item accordingly as indicated at 405. The user of the device may modify the state of the virtual item by interacting with the information associated with the selected virtual item through the receiving device. The user of the receiving device may also modify the physical location associated with the virtual item by selecting the virtual item and physically moving the receiving device to a new location before the modified virtual item interacts with the server again.

Information relating to the modified virtual item state may then be sent back to the server from the receiving device as indicated at 407. For example, once the user of the receiving device has modified either the state of the virtual item or the physical location tag associated with the virtual item, then the newly updated version of the virtual item is sent back to the server to be stored. When the server subsequently broadcasts information relating to the virtual item, the modifications made by the last user who interacted with the virtual item may be included in the broadcast information.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A method for distributing virtual items, comprising:
    sending, by one or more servers, a notification to a user device indicating availability of a virtual item, the virtual item configured to be available to the user device when the user device is determined to be proximate to one or more real world geolocations associated with the virtual item;
    determining, by the one or more servers, that the user device is proximate to the one or more geolocations associated with the virtual item;
    providing, by the one or more servers to the user device, information related to the virtual item when the user device is determined to be proximate to the one or more geolocations associated with the virtual item so as to enable viewing of at least a portion of the virtual item;
    receiving, at the one or more servers from the user device, an indication that a predetermined condition has been met associated with the viewing of the virtual item in order to cause activation of the virtual item, the predetermined condition includes taking a picture of a real world object at the one or more geolocations associated with the virtual item to cause the activation of the virtual item; and
    sending, by the one or more servers to the user device, an activated version of the virtual item for access by the user device, wherein the activation of the virtual item enables the user device to pick up the virtual item for moving the virtual item to another physical location.

2. The method of claim 1, wherein the predetermined condition includes processing data associated with an action detected to have been performed on the user device.

3. The method of claim 1, wherein said determining that the device is proximate to the one or more geolocations associated with the virtual item includes processing global positioning system (GPS) data received by the user device.

4. The method of claim 1, wherein the predetermined condition further includes processing data to cause a state of the virtual item to change responsive to data received from the user device.

5. The method of claim 1, wherein the information related to the virtual item is configured to be manipulated via the user device.

6. The method of claim 1, wherein the virtual item is associated with an advertising coupon that is configured to be redeemable for a good or service upon confirming activation of the virtual item.

7. The method of claim 1, wherein the virtual item is associated with a barcode that is displayable on a display associated with the user device, the barcode configured to be scanned.

8. The method of claim 1, wherein one or more portions of the virtual item are associated with a virtual coupon, wherein the virtual coupon is identified as usable when the user device receives data confirming the activation of the virtual item.

9. The method of claim 1, wherein the virtual item is unique, and wherein activation of the virtual item is further configured to exclude other user devices from accessing the virtual item.

10. A method for distributing virtual items for an application, comprising:
    receiving a connection from a user device to access the application;
    sending, by one or more servers, information responsive to the connection to a user device indicating availability of a virtual item, the virtual item configured to be available to the user device when the user device is determined to be proximate to one or more real world geolocations associated with the virtual item;
    providing, by the one or more servers to the user device, information related to the virtual item when the user device is determined to be proximate to the one or more geolocations associated with the virtual item so as to enable interaction with the virtual item;
    receiving, at the one or more servers from the user device, an indication that a predetermined condition has been met associated with the interaction with the virtual item in order to cause activation of the virtual item, the predetermined condition includes taking a picture of a real world object at the one or more geolocations associated with the virtual item to cause the activation of the virtual item; and
    sending, by the one or more servers to the user device, an activated version of the virtual item in the form of a coupon for access by the user device, wherein the activation of the virtual item enables the user device to pick up the virtual item for moving the virtual item to another physical location.

11. The method of claim 10, wherein the predetermined condition includes processing data associated with an action detected to have been performed on the user device.

12. The method of claim 10, wherein global positioning system (GPS) data received from the user device is processed to determine that the user device is proximate to the one or more geolocations associated with the virtual item.

13. The method of claim 10, wherein the predetermined condition further includes processing data to cause a state of the virtual item to change responsive to data received from the user device.

14. The method of claim 10, wherein the information related to the virtual item is configured to be manipulated via the user device.

15. The method of claim 10, wherein the coupon is configured to be redeemable for a good or service upon action of the virtual item.

16. The method of claim 10, wherein the coupon is associated with a barcode that is displayable on a display associated with the user device, the barcode configured to be scanned.

17. The method of claim 10, wherein one or more portions of the virtual item are associated with respective coupon image portions, the coupon associated with the virtual item.

18. The method of claim 10, wherein the virtual item is unique, and wherein the activation of the virtual item is further configured to exclude other user devices from accessing the virtual item.

19. A non-transitory computer readable storage medium storing a computer program for distributing virtual items, the non-transitory computer-readable storage medium comprising:

program instructions for sending, by one or more servers, a notification to a user device indicating availability of a virtual item, the virtual item configured to be available to the user device when the user device is determined to be proximate to one or more real world geolocations associated with the virtual item;

program instructions for determining, by the one or more servers, that the user device is proximate to the one or more geolocations associated with the virtual item;

program instructions for providing, by the one or more servers to the user device, information related to the virtual item when the user device is determined to be proximate to the one or more geolocations associated with the virtual item so as to enable viewing of the virtual item;

program instructions for receiving, at the one or more servers from the user device, an indication that a predetermined condition has been met associated with the viewing of the virtual item in order to cause activation of the virtual item, the predetermined condition includes taking a picture of a real world object at the one or more geolocations associated with the virtual item to cause the activation of the virtual item; and program instructions for sending, by the one or more servers to the user device, an activated version of the virtual item for access by the user device, wherein the activation of the virtual item enables the user device to pick up the virtual item for moving the virtual item to another physical location.

20. The non-transitory computer-readable storage medium as recited in claim 19, wherein the predetermined condition includes processing data associated with an action detected to have been performed on the user device.

21. The non-transitory computer readable storage medium of claim 19, wherein the virtual item is unique, and wherein the activation of the virtual item is further configured to exclude other user devices from accessing the virtual item.

* * * * *